Patented Dec. 29, 1936

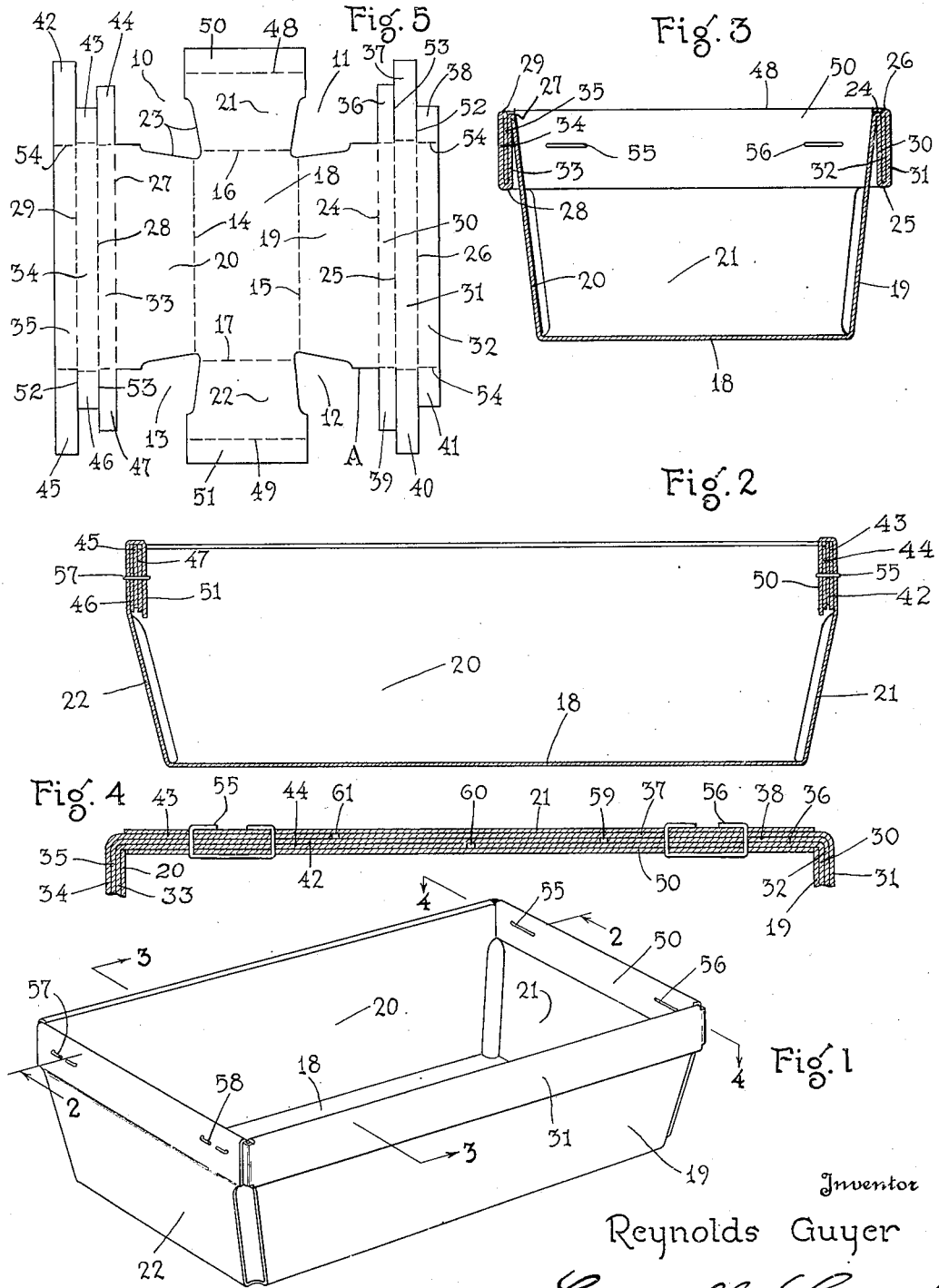

2,065,804

UNITED STATES PATENT OFFICE 2,065,804

FRUIT BASKET

Reynolds Guyer, St. Paul, Minn., assignor to Waldorf Paper Products Company, St. Paul, Minn., a corporation of Minnesota Application May 15, 1933, Serial No. 671,126

4 Claims. (Cl. 229—30)

My invention relates to fruit baskets and has for an object to provide a fruit basket capable of being constructed of paper, cardboard or similar flexible sheet material.

An object of the invention resides in constructing the basket so that the same may be constructed from a single blank capable of being folded into the desired form.

Another object of the invention resides in providing a fruit basket in which reinforcing members are provided at the marginal portions of the open end of the basket for stiffening and reinforcing the same.

A still further object of the invention resides in utilizing said marginal reinforcing members for securing the adjoining walls of the basket together.

A feature of the invention resides in constructing the basket with a bottom and with walls integral therewith and bendable upwardly from said bottom and in providing means for securing said walls together at the upper marginal portions thereof.

Another object of the invention resides in constructing the basket so that the same may be readily erected and fastened in a simple and expeditious manner.

An object of the invention resides in constructing the upper end of one of the walls with a flange bent back from the wall to stiffen and reinforce the same.

A still further object of the invention resides in constructing said flange with a tab adapted to be folded to lie along the adjoining wall and to be secured thereto.

An object of the invention resides in providing a flap on the upper end of the adjoining wall between which and said wall said tab is adapted to be disposed.

Another object of the invention resides in utilizing a plurality of flanges for reinforcing the upper marginal portion of one of the walls of the basket and in providing a like number of tabs, each issuing outwardly from its respective flange and adapted to overlie the adjoining wall and one another.

A feature of the invention resides in providing the alternate walls of the receptacle with flanges having tabs at the ends of the same and in causing the tabs on said flanges to meet one another intermediate the lateral edges of the intermediate walls.

An object of the invention resides in staggering the joints between the various pairs of flaps issuing from said flanges.

Other objects of the invention reside in the novel combination and arrangement of parts and in the details of construction hereinafter illustrated and/or described.

In the drawing:

Fig. 1 is a perspective view of a fruit basket illustrating an embodiment of my invention.

Fig. 2 is a longitudinal elevational sectional view taken on line 2—2 of Fig. 1.

Fig. 3 is an elevational cross sectional view taken on line 3—3 of Fig. 1.

Fig. 4 is a fragmentary plan sectional view taken on line 4—4 of Fig. 1 and drawn to an enlarged scale.

Fig. 5 is a developed view of the blank from which the fruit basket is constructed.

In the use of wooden baskets for containing fruit and similar perishable products, absorption of the juices of the fruit by the basket frequently occurs. In addition, the substances contained within the basket frequently take up odors from the wood, giving the contents of the basket an undesirable flavor. By means of the present invention, a waxed or similarly treated cardboard or other suitable sheet material may be employed which is impervious to moisture and which is coated with a tasteless coating preventing contamination of the contents of the basket.

My invention proper may be constructed from cardboard or any other similar suitable flexible sheet material. The fruit basket is constructed from a blank indicated at A in Fig. 5 which is formed from a substantially rectangular sheet of paper cut away at the corners as indicated at 10, 11, 12 and 13. The blank A is scored along two inner longitudinal lines 14 and 15 and along two inner transverse lines 16 and 17 which substantially intersect the longitudinal lines at the vertexes of the cuts 10, 11, 12 and 13. By means of the said cuts and scoring the blank is divided into a bottom 18, side walls 19 and 20 and end walls 21 and 22. These walls may be folded upwardly along the score lines 14, 15, 16 and 17 to cause the basket to assume the shape illustrated in Fig. 1. The cuts 10, 11, 12 and 13 are formed with an acute angle bounded by the edges 23 thereof which cause the baskets to flare outwardly as shown in Fig. 1 when the basket is erected, permitting of nesting of the baskets and the corresponding packing of a number of baskets in a limited amount of space.

The portions of the blank A from which the side walls 19 and 20 are constructed are formed with score lines 24, 25, 26, 27, 28 and 29 which are parallel to one another and to the score lines 14 and 15. Between these various score lines are formed flanges 30, 31, 32, 33, 34 and 35. The flanges 31, 32, 34 and 35 are of the same width while the flanges 30 and 33 are slightly narrower for a purpose to be presently explained. At the ends of the flanges 30, 31, and 32 are formed tabs 36, 37, 38, 39, 40 and 41 while at the ends of the flanges 33, 34 and 35 are formed tabs 42, 43, 44, 45, 46 and 47. The various flanges 30, 31, 32, 33, 34 and 35 are scored at their ends along lines 54 which lie substantially in continuation of the edges 23 of cuts 10, 11, 12 and 13. By means of these score lines the various tabs may be folded outwardly at right angles to the respective flanges from which they issue. These various tabs are separated from one another by shearing the blank along lines 52 and 53 which lie in continuation of the score lines 25, 26, 28 and 29 and which extend up to the score lines 54. Two score lines 48 and 49 extend across the upper ends of the end walls 21 and 22 and form flaps 50 and 51 at the upper ends of said end walls which serve a purpose to be presently described in detail.

The basket is erected as follows: The four walls 19, 20, 21 and 22 of the basket are first folded upwardly by bending the blank along the score lines 14, 15, 16 and 17. The basket so formed is then inserted in a sheet metal form which consists of a bottom and side walls parallel with the side walls of the basket and of such dimensions as to comfortably receive the folded structure of the basket. While so disposed all of the flanges 30, 31, and 32 are folded back along the score line 24 until the flange 30 lies substantially parallel to the side wall 19. The two flanges 31 and 32 are next folded along the score line 26 to cause the flange 32 to overlie the flange 31. The two flanges 31 and 32 are thereafter folded upwardly along score line 25 to overlie the flange 30. The flanges 33, 34, 35 are next similarly folded and the structures so folded are temporarily held in place through suitable fasteners, such as paper clips or other devices now in common use for holding sheets of paper together. These clips in addition to holding the flange structure of the basket in proper position with respect to the side walls thereof, hold the said basket mounted upon the sheet metal form upon which the same is placed.

The various tabs on the ends of the flanges when the flanges are in folded position, extend outwardly therefrom and in alignment therewith. These tabs are next bent at right angles to the flanges from which they issue. When so disposed the tabs 44 and 36 lie in continuation, the tabs 43 and 37 lie in continuation and the tabs 42 and 38 lie in continuation and are disposed at the same end of the basket. After these tabs have been properly arranged the end wall 21 is brought up against the said tabs and the flap 50 turned over the said tabs by bending the end wall structure along the score line 48. Two staples 55 and 56 are next driven through the entire end structure consisting of the end wall 21, flap 50 and the various tabs disposed between the same. These staples serve to hold the various parts rigidly secured together. The tabs 45, and 41, 46 and 40 and 47 and 39 are next folded in the same manner and the end wall 22 brought up against the same and flap 41 folded to envelop the said tabs. These structures are likewise secured together through staples 57 and 58 whereby both of the end walls of the basket are secured to the side walls thereof. From an inspection of Figs. 4 and 5 it will be seen that the various tabs of the basket are joined at localities designated at 59, 60 and 61. Due to the fact that the various tabs are of different length as shown in Fig. 5, the joints 59, 60 and 61 become staggered whereby rigidity and stiffness are given to the basket. After the staples 55, 56, 57 and 58 have been applied, the clips holding the flanges of the basket in place may be disconnected from the flanges and the basket removed from the form.

In the construction of my invention I prefer to use a cardboard or other similar paper board which is coated with paraffin or some other suitable water proofing material. Such paper board may be printed or embellished upon the outer surface thereof to make an extremely attractive package. If desired, any other materials may be employed which have the desired characteristics.

By means of my improved construction four thicknesses of paper are provided along the upper marginal portions of the side walls of the basket which greatly stiffen and reinforce the same. The tabs disposed at the ends of these flanges become interlocked with the end walls of the basket and are securely held attached thereto through the flaps formed on said end walls. By means of this construction, five thicknesses of material are provided at the end walls which also stiffen and reinforce the end wall structure at the upper marginal portion thereof. It can hence be readily comprehended that an extremely rigid and substantial construction is provided which will have sufficient strength to meet the requirements. By making the flanges 32 and 35 narrower than the other flanges the folded edges formed at score lines 29 and 26 extend above the folded edges formed at score lines 27 and 24. When the basket is grasped between the fingers, the thumb engages the folded edges formed by score lines 29 or 26 causing the two flanges 33, 35, or 31, 32 as the case may be, to bend outwardly without bending the sides 19 and 20 thereby preventing distortion of the basket.

My invention is extremely advantageous in that an extremely simple and inexpensive construction is provided which may be readily used for the desired purpose in place of wooden or similarly constructed baskets now employed. With my invention a coated paper may be utilized which can be made impervious to moisture and which will be free from odors tending to give the contents of the container an undesirable taste. My improved fruit basket can be erected quickly and easily and only a stapling machine will be required for securing the parts together. In this manner the container blanks may be shipped to the locality where desired for use and erected on the premises. My improved fruit basket is extremely attractive in appearance and is rigid and substantial in construction. My invention may be construced at a smaller cost than wooden containers and may be made extremely attractive by embellishing the outer surface as by printing or otherwise.

Changes in the specific form of my invention, as herein disclosed, may be made within the scope of what is claimed without departing from the spirit of my invention.

Having described my invention, what I claim as new and desire to protect by Letters Patent is:

1. In a container formed from flexible sheet material and open at the top, said container comprising a bottom and walls integral therewith and bent upwardly therefrom, a plurality of flanges formed at the upper ends of alternate walls of the container, all of said flanges on each wall being folded back upon said wall to reinforce the marginal portion thereof, tabs at both ends of each of said flanges, the tabs at each end being bent outwardly to overlie one another and the marginal portions of the intermediate walls, the tabs from the walls on both sides of an intermediate wall meeting one another intermediate the edges of the intermediate wall, the joints between successive tabs overlying the same marginal portion of an intermediate wall being broken with respect to one another.

2. In a container formed from flexible sheet material and open at the top, said container comprising a bottom and walls integral therewith and bent upwardly therefrom, a flange bent downwardly from the upper edge of one of said walls, a flange bent upwardly from the lower edge of said last named flange and overlying said flange upon the outer surface thereof, the upper edge of said second flange being higher than the upper edge of said first flange, and means for holding said flanges in position.

3. In a container formed from flexible sheet material and open at the top, said container comprising a bottom and walls integral therewith and bent upwardly therefrom, a flange depending from the upper edge of one of said walls and being connected thereto by a fold, a reinforcing rim constructed of two juxtaposed parts connected together by a fold, said fold being disposed at the upper portion of the rim and adjacent the fold between said flange and wall, said flange being connected to said rim and being free from said wall below said first named fold, said first named fold being lower than said second named fold.

4. In a container formed from flexible sheet material and open at the top, said container comprising a bottom and walls integral therewith and bent upwardly therefrom, a plurality of flanges formed at the upper ends of alternate walls of the container, all of said flanges on each wall being folded back upon the said wall to reinforce the marginal portion thereof, tabs at both ends of each of said flanges, the tabs at each end being of different lengths and being bent to overlie one another and the marginal portions of the intermediate walls, the tabs from the walls on both sides of the intermediate wall meeting one another intermediate the edges of the intermediate wall.

REYNOLDS GUYER.